United States Patent
Krogman et al.

(10) Patent No.: US 11,747,532 B2
(45) Date of Patent: Sep. 5, 2023

(54) LAMINATED OPTICAL PRODUCTS AND METHODS OF MAKING THEM

(71) Applicant: SOUTHWALL TECHNOLOGIES INC., Palo Alto, CA (US)

(72) Inventors: Kevin C. Krogman, Santa Clara, CA (US); Lee Campbell Boman, Belmont, CA (US); Julius George Kozak, Antioch, CA (US); Kayur Ashwin Patel, San Jose, CA (US); Jeremy B. Stegall, Christiansburg, VA (US); Anthony Brian Port, Redwood City, CA (US)

(73) Assignee: Southwall Technologies Inc., Palo Alto, CA (US)

( * ) Notice: Subject to any disclaimer, the term of this patent is extended or adjusted under 35 U.S.C. 154(b) by 519 days.

(21) Appl. No.: 15/705,689

(22) Filed: Sep. 15, 2017

(65) Prior Publication Data

US 2019/0086595 A1    Mar. 21, 2019

(51) Int. Cl.
*G02B 5/22* (2006.01)
*G02B 5/20* (2006.01)
(Continued)

(52) U.S. Cl.
CPC ............... *G02B 5/223* (2013.01); *B32B 7/12* (2013.01); *B32B 27/00* (2013.01); *B32B 27/08* (2013.01);
(Continued)

(58) Field of Classification Search
CPC . G02B 5/223; G02B 1/10; G02B 1/14; G02B 5/206; B32B 27/00; B32B 7/12;
(Continued)

(56) References Cited

U.S. PATENT DOCUMENTS

| 2,282,026 A | 5/1942 | Bren et al. |
| 2,282,057 A | 5/1942 | Hopkins et al. |

(Continued)

FOREIGN PATENT DOCUMENTS

| CN | 1765827 A | 5/2006 |
| CN | 101355866 A | 1/2009 |

(Continued)

OTHER PUBLICATIONS

ASTM G173-03; Standard Tables for Reference Solar Spectral Irradiances: Direct Normal and Hemispherical on 37° Tilted Surface.

(Continued)

*Primary Examiner* — Jade R Chwasz
(74) *Attorney, Agent, or Firm* — Michael K. Carrier

(57) ABSTRACT

Optical products are disclosed that include a polymer substrate; a composite coating, deposited on the polymer substrate; a permeating adhesive, which permeates the composite coating and is in contact with the polymer substrate; and a protective layer, secured to the composite coating by the permeating adhesive. The composite coating includes at least a first layer and a second layer, each of which is provided with a binding group component which together form a complementary binding group pair. The optical products exhibit improved resistance to delamination during storage and use.

26 Claims, 1 Drawing Sheet

(51) Int. Cl.
  *B32B 27/00* (2006.01)
  *G02B 1/14* (2015.01)
  *B32B 7/12* (2006.01)
  *B32B 27/08* (2006.01)
  *B32B 27/20* (2006.01)
  *B32B 37/12* (2006.01)

(52) U.S. Cl.
  CPC .............. *B32B 27/20* (2013.01); *B32B 37/12* (2013.01); *G02B 1/14* (2015.01); *G02B 5/208* (2013.01); *B32B 2255/00* (2013.01); *B32B 2307/40* (2013.01); *B32B 2309/105* (2013.01)

(58) Field of Classification Search
  CPC ......... B32B 37/12; B32B 27/08; B32B 27/20; B32B 2309/105; B32B 2255/00; B32B 2307/40
  USPC .................................. 359/885; 427/162, 532
  See application file for complete search history.

(56) References Cited

U.S. PATENT DOCUMENTS

| | | | |
|---|---|---|---|
| 3,978,264 | A | 8/1976 | Tarbell et al. |
| 4,337,990 | A | 7/1982 | Fan et al. |
| 4,410,501 | A | 10/1983 | Taramasso et al. |
| 4,952,457 | A | 8/1990 | Cartier et al. |
| 4,973,511 | A | 11/1990 | Farmer et al. |
| 5,019,197 | A | 5/1991 | Henderson |
| 5,030,513 | A | 7/1991 | Hartman |
| 5,071,206 | A | 12/1991 | Hood et al. |
| 5,091,258 | A | 2/1992 | Moran |
| 5,264,058 | A | 11/1993 | Hoagland et al. |
| 5,339,198 | A | 8/1994 | Wheatly et al. |
| 5,609,943 | A | 3/1997 | DeKoven et al. |
| 5,643,390 | A | 7/1997 | Don et al. |
| 5,818,564 | A | 10/1998 | Gray et al. |
| 5,853,864 | A | 12/1998 | Bunnelle |
| 5,925,228 | A | 7/1999 | Panitz et al. |
| 5,956,175 | A | 9/1999 | Hojnowski |
| 6,030,671 | A | 2/2000 | Yang et al. |
| 6,055,088 | A | 4/2000 | Fix et al. |
| 6,221,112 | B1 | 4/2001 | Snider |
| 6,489,028 | B1 | 12/2002 | Degand et al. |
| 6,627,175 | B2 | 9/2003 | Schoebrechts |
| 6,815,022 | B2* | 11/2004 | Renck ....................... B31C 3/00 428/34.3 |
| 6,881,444 | B2 | 4/2005 | Hong et al. |
| 6,929,864 | B2 | 8/2005 | Fleming et al. |
| 7,311,943 | B2 | 12/2007 | Jacobson et al. |
| 7,332,218 | B1 | 2/2008 | Gilbert |
| 7,659,002 | B2 | 2/2010 | Coster et al. |
| 7,892,647 | B2 | 2/2011 | Fisher et al. |
| 7,951,473 | B2 | 5/2011 | Maschwitz |
| 8,234,998 | B2 | 8/2012 | Krogman et al. |
| 8,277,899 | B2 | 10/2012 | Krogman et al. |
| 8,689,726 | B2 | 4/2014 | Krogman et al. |
| 8,765,263 | B2 | 7/2014 | Ho et al. |
| 8,828,489 | B2 | 9/2014 | Dubois et al. |
| 8,882,267 | B2 | 11/2014 | Ishak et al. |
| 8,921,433 | B2 | 12/2014 | Bell et al. |
| 9,387,505 | B2 | 7/2016 | Krogman et al. |
| 9,395,475 | B2 | 7/2016 | Krogman et al. |
| 9,453,949 | B2 | 9/2016 | Nand et al. |
| 9,817,166 | B2 | 11/2017 | Boman et al. |
| 9,891,357 | B2 | 2/2018 | Boman et al. |
| 2001/0046564 | A1 | 11/2001 | Kotov |
| 2001/0048975 | A1 | 12/2001 | Winterton et al. |
| 2002/0055552 | A1 | 5/2002 | Schliesman et al. |
| 2002/0174946 | A1* | 11/2002 | Ikeda ................... C08G 18/672 156/307.3 |
| 2003/0167878 | A1 | 9/2003 | Al-Salim et al. |
| 2003/0224182 | A1 | 12/2003 | Simpson et al. |
| 2004/0047979 | A1 | 3/2004 | Qiu et al. |
| 2004/0224095 | A1 | 11/2004 | Miller |
| 2004/0229049 | A1 | 11/2004 | Biore |
| 2005/0019550 | A1 | 1/2005 | McGurran et al. |
| 2005/0025976 | A1 | 2/2005 | Faris |
| 2005/0208319 | A1 | 9/2005 | Finley et al. |
| 2006/0029634 | A1 | 2/2006 | Berg et al. |
| 2006/0234032 | A1 | 10/2006 | Morrison et al. |
| 2006/0257760 | A1 | 11/2006 | Mori et al. |
| 2007/0032869 | A1 | 2/2007 | Gilliard et al. |
| 2007/0053088 | A1 | 3/2007 | Kranz |
| 2007/0054194 | A1 | 3/2007 | Zhang et al. |
| 2007/0104922 | A1 | 5/2007 | Zhai et al. |
| 2008/0060302 | A1 | 3/2008 | Bletsos et al. |
| 2008/0233371 | A1 | 9/2008 | Hayes et al. |
| 2008/0299036 | A1 | 12/2008 | Vitner et al. |
| 2009/0015908 | A1 | 1/2009 | Ando et al. |
| 2009/0029077 | A1 | 1/2009 | Atanasoska et al. |
| 2009/0148707 | A1 | 6/2009 | Anderson et al. |
| 2009/0153953 | A1 | 6/2009 | Banerjee et al. |
| 2009/0155545 | A1 | 6/2009 | Purdy et al. |
| 2009/0161220 | A1 | 6/2009 | Banerjee et al. |
| 2009/0162592 | A1 | 6/2009 | Baikerikar et al. |
| 2009/0209665 | A1 | 8/2009 | Fu et al. |
| 2009/0324910 | A1 | 12/2009 | Gemici et al. |
| 2010/0003499 | A1 | 1/2010 | Krogman et al. |
| 2010/0047620 | A1 | 2/2010 | Decker et al. |
| 2010/0092377 | A1 | 4/2010 | Scott et al. |
| 2010/0098902 | A1 | 4/2010 | Kotov et al. |
| 2010/0189913 | A1 | 7/2010 | Kotov et al. |
| 2010/0190001 | A1 | 7/2010 | Barton et al. |
| 2010/0208349 | A1 | 8/2010 | Beer et al. |
| 2010/0209593 | A1 | 8/2010 | Banerjee et al. |
| 2010/0291364 | A1 | 11/2010 | Kourtakis et al. |
| 2010/0304150 | A1 | 12/2010 | Zheng et al. |
| 2010/0315693 | A1 | 12/2010 | Lam et al. |
| 2011/0014366 | A1 | 1/2011 | Nogueira et al. |
| 2011/0075096 | A1 | 3/2011 | Ishak et al. |
| 2011/0089018 | A1 | 4/2011 | Chang et al. |
| 2011/0135888 | A1 | 6/2011 | Xu et al. |
| 2011/0195239 | A1 | 8/2011 | Takane |
| 2011/0274767 | A1 | 11/2011 | Kato et al. |
| 2012/0028005 | A1 | 2/2012 | Zheng et al. |
| 2012/0052317 | A1 | 3/2012 | Shi et al. |
| 2012/0082831 | A1 | 4/2012 | Wang et al. |
| 2012/0194819 | A1 | 8/2012 | Varma |
| 2013/0003206 | A1 | 1/2013 | Kabagambe et al. |
| 2013/0108832 | A1 | 5/2013 | Domereq et al. |
| 2013/0183516 | A1 | 7/2013 | Krogman et al. |
| 2013/0273242 | A1 | 10/2013 | Krogman et al. |
| 2013/0278989 | A1 | 10/2013 | Lam et al. |
| 2014/0050909 | A1 | 2/2014 | Choi et al. |
| 2014/0079884 | A1 | 3/2014 | Krogman et al. |
| 2014/0079922 | A1 | 3/2014 | Wang et al. |
| 2014/0141232 | A1 | 5/2014 | Hong et al. |
| 2014/0218792 | A1 | 8/2014 | Krogman et al. |
| 2014/0220351 | A1 | 8/2014 | Krogman et al. |
| 2014/0242321 | A1 | 8/2014 | Schmid et al. |
| 2014/0242393 | A1 | 8/2014 | Olmeijer et al. |
| 2015/0033988 | A1 | 2/2015 | Wu et al. |
| 2015/0037574 | A1 | 2/2015 | Amano et al. |
| 2015/0285956 | A1 | 10/2015 | Schmidt et al. |
| 2016/0082697 | A1 | 3/2016 | Hara et al. |
| 2016/0137802 | A1 | 5/2016 | Lee et al. |
| 2016/0168035 | A1 | 6/2016 | Matus et al. |
| 2016/0170104 | A1 | 6/2016 | Nand et al. |
| 2016/0230017 | A1 | 8/2016 | Woolf |
| 2016/0231480 | A1* | 8/2016 | Boman ................... B05D 1/36 |
| 2016/0319165 | A1 | 11/2016 | Choi et al. |
| 2017/0005321 | A1 | 1/2017 | Sugata et al. |
| 2017/0010389 | A1 | 1/2017 | Nand et al. |
| 2017/0075045 | A1 | 3/2017 | Medwick et al. |

FOREIGN PATENT DOCUMENTS

| | | |
|---|---|---|
| CN | 102020899 A | 4/2011 |
| CN | 102645692 B | 11/2014 |
| EP | 1 201 616 A2 | 5/2002 |
| EP | 1 046 068 B1 | 5/2003 |
| EP | 1 334 380 A1 | 8/2003 |
| EP | 2 130 844 A1 | 12/2009 |

(56) References Cited

FOREIGN PATENT DOCUMENTS

| EP | 2226364 A1 | 9/2010 |
|---|---|---|
| EP | 2 343 579 A1 | 7/2011 |
| GB | 1 511 652 A | 5/1978 |
| GB | 2 198 739 A | 6/1988 |
| JP | H 04 197427 A | 7/1992 |
| JP | 11 292537 A | 10/1999 |
| JP | 2005-239999 A | 9/2005 |
| JP | 2006-301125 A | 11/2006 |
| JP | 2008 041377 A | 2/2008 |
| JP | 2008-188513 A | 8/2008 |
| JP | 2009-242687 A | 10/2009 |
| JP | 2010 132514 A | 6/2010 |
| JP | S57117749 A | 6/2010 |
| JP | 2018-109734 A | 7/2018 |
| KR | 10-2004-0086912 A | 10/2004 |
| KR | 10-2005-0059582 A | 6/2005 |
| KR | 10-2011-0082625 A | 7/2011 |
| KR | 10-2011-0083729 A | 7/2011 |
| TW | 201020115 A | 6/2010 |
| TW | 201421640 A | 6/2014 |
| WO | WO 00/10934 A1 | 3/2000 |
| WO | WO 2005/072947 A1 | 8/2005 |
| WO | WO 2006/100060 A2 | 9/2006 |
| WO | WO 2010/044402 A1 | 4/2010 |
| WO | WO 2011/144754 A2 | 11/2011 |
| WO | WO 2012/075309 A1 | 6/2012 |
| WO | WO 2014/099367 A1 | 6/2014 |
| WO | WO 2014/150903 A1 | 9/2014 |
| WO | WO 2014/172139 A2 | 10/2014 |
| WO | WO 2014/172332 A1 | 10/2014 |
| WO | WO 2014/193550 A1 | 12/2014 |
| WO | WO 2015/095317 A1 | 6/2015 |
| WO | WO 2017/077359 A1 | 5/2017 |
| WO | WO 2017/095468 A1 | 6/2017 |
| WO | WO 2017/095469 A1 | 6/2017 |

OTHER PUBLICATIONS

ASTM D1003-07; Standard Test Method for Haze and Luminous Transmittance of Transparent Plastics.
ASTM D1787-89; Standard Test Method for Pentosans in Cellulose.
ASTM D3359-09$^{\varepsilon 2}$; Standard Test Methods for Measuring Adhesion by Tape Test.
ASTM D4329-13; Standard Practice for Fluorescent Ultraviolet (UV) Lamp Apparatus Exposure of Plastics.
ASTM D4587-11; Standard Practice for Fluorescent UV-Condensation Exposures of Paint and Related Coatings.
Hennink et al.; "Novel crosslinking methods to design hydrogels"; Advanced Drug Delivery Reviews; vol. 54 (2002); pp. 13-36.
Krogman, et al.; "Automated Process for Improved Uniformity and Versatility of Layer-by-Layer Deposition"; Langmuir 2007, 23, pp. 3137-3141.
Lee et al.; "Formation of Nanoparticle-Loaded Microcapsules Based on Hydrogen-Bonded Multilayers"; Chem. Mater.; 2005, vol. 17; pp. 1099-1105.
Nolte, Adam John; "Fundamental Studies of Polyelectrolyte Multilayer Films: Optical, Mechanical, and Lithographic Property Control"; Thesis (PhD); Massachusetts Institute of Technology; Dept. of Materials Science and Engineering; Feb. 2007 (Abstract, pp. 32-29, Figure 2.3).
Rouse, et al.; "Sol-Gel Processing of Ordered Multilayers to Produce Composite Films of Controlled Thickness"; Chem. Mater.; 2000; 12; pp. 2502-2507.

Kim, et al.; "Synthesis and Structures of New Layered Ternary Manganese Tellurides: AMnTe$_2$ (A=K, Rb, Cs) Na$_3$Mn$_4$Te$_6$, and NaMn$_{1.56}$Te$_2$"; Inorg. Chem.; 1999; 38; pp. 235-242.
Kim, et al.; "Hydrothermal synthesis of titanium dioxides using basic peptizing agents and their photocatalytic activity"; Chemical Engineering Science; 62 (2007); pp. 5154-5159.
PCT International Search Report for International Application No. PCT/US2011/064397 dated Jun. 6, 2012.
PCT International Search Report for International Application No. PCT/US2012/025138 dated Oct. 30, 2012.
PCT International Search Report for International Application No. PCT/US2012/059147 dated Mar. 28, 2013.
PCT International Search Report for International Application No. PCT/US2012/062892 dated Mar. 29, 2013.
PCT International Search Report for International Application No. PCT/US2012/059142 dated Apr. 29, 2013.
PCT International Search Report for International Application No. PCT/US2013/059337 dated Dec. 6, 2013.
Cammarata, et al.; "Carbodiimide Induced Cross-Linking, Ligand Addition, and Degradation in Gelatin"; Molecular Pharmaceutics; 2015; 12; pp. 783-793.
Wu et al.; "Deformable Antireflection Coatings from Polymer and Nanoparticle Multilayers"; Advanced Materials, 2006, 18, pp. 2699-2702.
PCT International Search Report for International Application No. PCT/US2015/063082 dated Mar. 24, 2016.
PCT International Search Report for International Application No. PCT/US2016/028757 dated Sep. 1, 2016.
Supplementary European Search Report dated Nov. 4, 2016 for European Patent Application No. 13836268.6.
Hiller, Jeri'Ann et al, "Reversibly erasable nanoporous antireflection coatings from polyelectrolyte multilayers", Nature Materials, vol. 1, No. 1, Sep. 1, 2002, pp. 59-63, XP055016249.
PCT International Search Report for International Application No. PCT/US2016/028756 dated Nov. 29, 2016.
PCT International Search Report and Written Opinion for International Application No. PCT/US2018/049685 dated Jan. 3, 2019.
PCT International Search Report for International Application No. PCT/US2018/045933 dated Nov. 30, 2018.
Taiwan Office Action and Search Report, ROC (Taiwan) Patent Application No. 104137947, Date of Completion of Search Mar. 21, 2019. (Original language Office Action and English Translation of Search Report).
Taiwan Office Action and Search Report, ROC (Taiwan) Patent Application No. 105112719, Date of Completion of Search Jun. 2, 2019. (Original language Office Action and English Translation of Search Report).
PCT International Search Report and Written Opinion for International Application No. PCT/US2019/025342 dated Jun. 25, 2019.
PCT International Search Report and Written Opinion for International Application No. PCT/US2019/025338 dated Jun. 25, 2019.
Taiwan Office Action and Search Report, ROC (Taiwan) Patent Application No. 105112717, Date of Completion of Search Jun. 2, 2019.
USPTO Notice of Allowance dated Apr. 3, 2019 in co-pending U.S. Appl. No. 15/689,493.
USPTO Office Action dated Jul. 25, 2019 in co-pending U.S. Appl. No. 15/947,891.
USPTO Office Action dated Jul. 25, 2019 in co-pending U.S. Appl. No. 15/947,903.
USPTO Notice of Allowance dated Jan. 31, 2020 in co-pending U.S. Appl. No. 15/947,891.

* cited by examiner

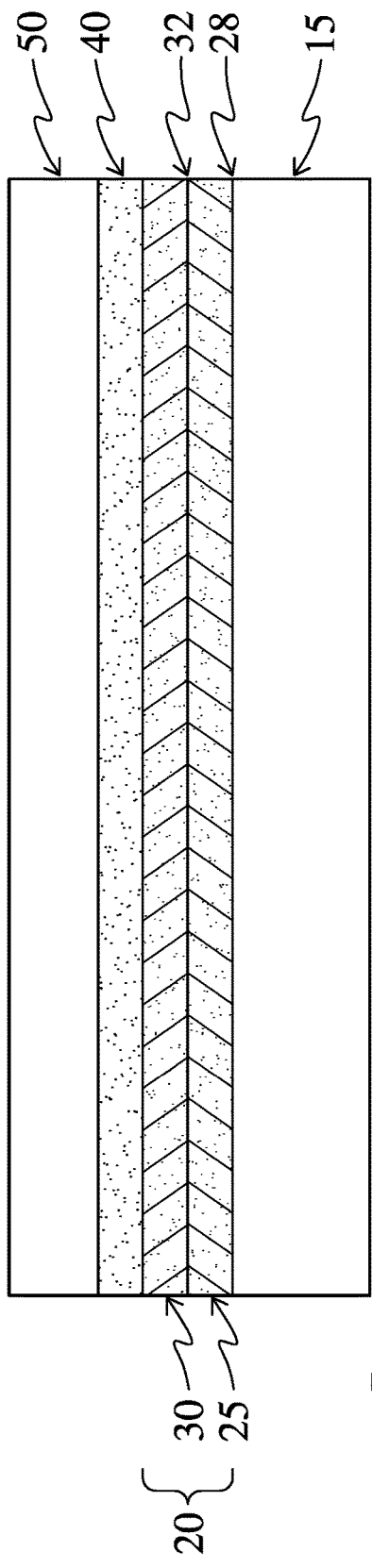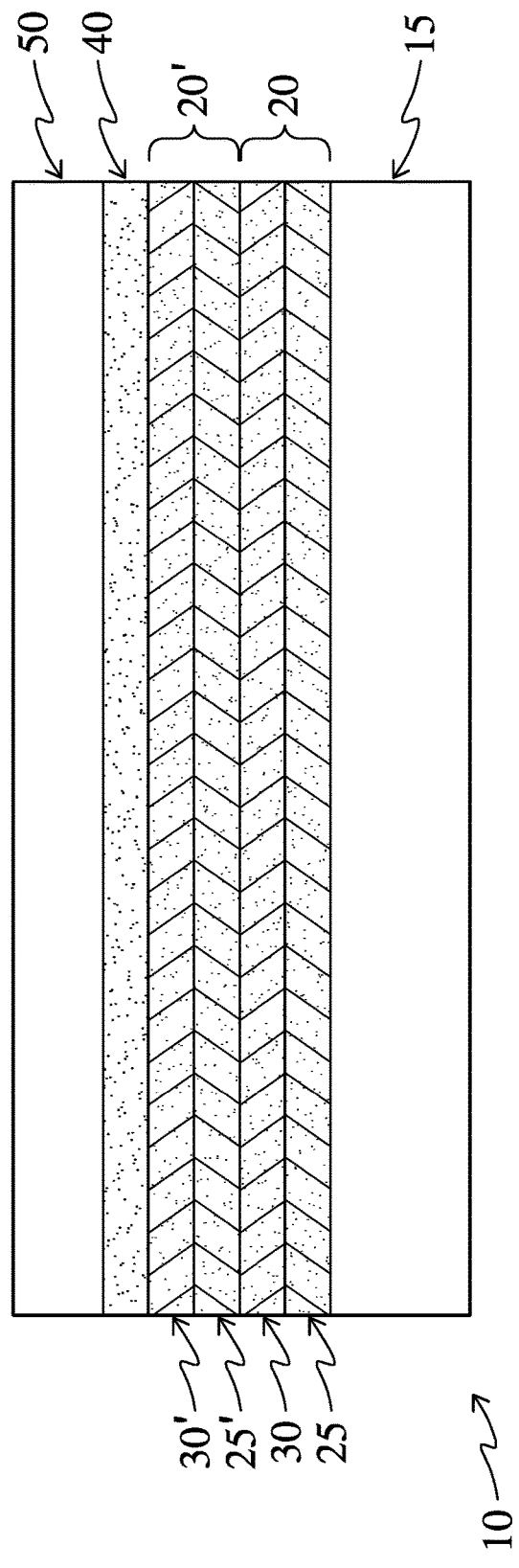

LAMINATED OPTICAL PRODUCTS AND METHODS OF MAKING THEM

FIELD OF THE INVENTION

The present invention relates to laminated optical products that include a polymer substrate, a layer-by-layer composite film deposited on the substrate, and a protective layer laminated to the layer-by-layer composite film with a permeating adhesive that provides resistance to delamination.

BACKGROUND OF THE INVENTION

Modern heat rejection films are typically multilayer films applied to glass or plastic windows to reduce the amount of infrared (IR), visible light, ultraviolet (UV), and/or other electromagnetic (EM) radiation entering windows. These films are designed to allow only desirable portions of the incoming solar spectrum to penetrate the window.

Early solar control films included dyed polymeric substrates, in which color was imparted through the use of organic dyes. These films and their manufacturing processes suffer various drawbacks. For example, the substrates require exposure to organic solvents and elevated temperatures, which present both mechanical and chemical challenges such as environmental hazards and costs associated with storing the raw solvents and disposing of the resulting waste. Also, only a limited number of organic dyes are soluble and stable in the hot solvent and many of them are subject to degradation by the high-energy radiation (sub 400 nm wavelength) to which the film is subjected, thereby shortening the useful lifetime of the product. Further, uneven rates of degradation for the several dyes used can result in a color shift over the lifetime of the film.

Some solar control films rely on thin metal layers applied to a polymeric substrate that can reflect EM radiation with wavelengths longer than those of the visible spectrum. These films have high transparency and high heat rejection. They may be applied directly to the substrate or may be a part of an optical stack, in which the metal layers are separated by dielectric layers such as metal oxides, the effect being to block unwanted radiation while allowing adequate visible light. One drawback of these metal layers is that they also block other unintended portions of the EM spectrum including RF and microwave frequencies, interfering with cell phone and radio signals, as well as rain sensors in automobiles. This has become more important in recent years with increased use of cell phones, GPS, and other mobile electronic devices. The surface of these films are typically protected with a hardcoat, a protective polymer layer such as PET, or both.

More recently, layer-by-layer films have been developed to provide similar functionalities. Processes of making these films take advantage of charge-charge, hydrogen bonding, or other complementary interactions to assemble successive layers. This requires the use of solvents, typically water, to ionize molecules or support hydrogen donation and acceptance in the deposition solutions. These films are typically porous, and more susceptible to delamination than more conventional window film components such as those already described.

For example, U.S. Pat. No. 9,453,949, the disclosure of which is incorporated herein by reference, discloses layer-by-layer composite films that include electromagnetic energy-absorbing insoluble particles that may be selected to provide pigmentation, UV-absorption, and/or IR-absorption properties. Likewise, U.S. Pat. No. 9,395,475, the disclosure of which is incorporated herein by reference, discloses layer-by-layer integrated stacks that serve as optical filters. U.S. Pat. Publn. No. 2014/0242321 discloses that such layer-by-layer composites are typically porous, and that a non-porous bridging layer may be used, adjacent to a pressure sensitive adhesive layer, to serve as a barrier against migration of materials from the PSA layer into other layers present in the composite. U.S. Pat. No. 8,277,899 discloses methods for modifying the properties of porous thin films, in which a reactive species is applied to the porous thin film and allowed to crosslink, thus increasing mechanical strength and wear resistance. These layer-by-layer films are thus prone to wear and are typically provided with a hardcoat, a protective polymer layer, or both.

A continuing need exists in the art for an optical product that meets the demands of current window films and is resistant to delamination during storage and use.

SUMMARY OF THE INVENTION

The present invention relates to optical products that include a polymer substrate; a composite coating; a permeating adhesive, which permeates the composite coating to contact the polymer substrate; and a protective layer, secured to the composite coating by the permeating adhesive. The composite coating is deposited on the polymer substrate, and includes at least a first layer and a second layer, each provided with a binding group component which together form a complementary binding group pair. The optical products of the invention exhibit improved resistance to delamination during storage and use.

Further aspects of the invention are as disclosed and claimed herein.

BRIEF DESCRIPTION OF THE DRAWINGS

The invention will be described in further detail below and with reference to the accompanying drawings, wherein like reference numerals throughout the figures denote like elements and wherein:

FIG. 1 is a schematic cross-section of an embodiment of the optical product of the present invention;

FIG. 2 is a schematic cross-section of an embodiment of the present invention that includes a plurality of composite coatings.

DETAILED DESCRIPTION

The present invention relates to optical products that include a polymer substrate; a composite coating, deposited on the polymer substrate; a permeating adhesive, which permeates the composite coating so as to contact the polymer substrate; and a protective layer, secured to the composite coating by the permeating adhesive. The composite coatings of the invention are produced by layer-by-layer techniques, and thus comprise at least a first layer and a second layer, each of which is provided with a binding group component, which together form a complementary binding group pair. We have found that the permeating adhesives of the invention provide improved delamination characteristics when compared with optical products made using conventional laminating adhesives and processes, for example when laminating the composite coatings of the invention to polymer protective layers.

Conventional laminating adhesives, typically aliphatic polyester polyols formulated with isocyanate cross-linkers, are used as solvent-borne coatings applied to the surface of a film by gravure, slot die, or other methods in a continuous, roll-to-roll process. The coating is dried, that is the solvent is removed, by passing the film through an oven, and a second film is then pressed against the adhesive-coated film using a nip-roll. These conventional laminating adhesives have glass transition temperatures above room temperature and so require a heated nip-roll to create a good bond between the two films. Optical films are typically laminated to a protective layer such as PET using such a laminating adhesive.

We have found that the composite coating portion of the optical products of the present invention, deposited on a polymer substrate using layer-by-layer techniques, is prone to delamination. Using conventional laminating adhesives applied to the protective layer, we have found that during the lamination process, when the adhesive is applied to the protective layer, if the laminating adhesive is not sufficiently fluid or liquid to fully penetrate the porous network, a layer of filled pores on top of a layer of unfilled pores is formed. We have found this interface to be a source of cohesive failure during delamination testing.

We have surprisingly found that, when an adhesive is selected that is sufficiently fluid or liquid so as to permeate or penetrate the entire depth of the composite coating, thus contacting the underlying polymer substrate, the adhesive serves to strengthen the composite coating, as well as to firmly adhere the protective layer to the composite coating. This is in contrast with conventional laminating adhesives, which are typically dried prior to bringing the two films together such that they are sufficiently viscous to remain on the surface of two film layers joined to one another, and are not intended to permeate the films, nor to flow outside the area to which they are applied. This is especially the case with those conventional laminating adhesives that are dried prior to lamination.

As part of the typical manufacturing process, raw optical film, produced by whatever coating process is desired, is provided with a protective layer, for example a sheet of PET plastic, which is adhered to the surface of the optical film. The adhesion of the entire stack may be tested using a bag delamination test, as further described in the experimental section, in which increasing weight is added to a partially peeled section of film until the weight overcomes the adhesive strength and the layers delaminate. According to the present invention, we exploit the porosity of layer-by-Layer (LbL) films, and provide a process by which the film is fully penetrated or permeated by a permeating adhesive, improving the performance of the resulting optical product, as evidenced by performance in the bag delamination test.

Thus, according to the invention, the viscosity of an adhesive applied to the surface of a porous LbL film will be sufficiently low that it will flow or permeate through the entire thickness of the porous network of the LbL or composite film and reach the opposite polymer substrate, thereby reducing or eliminating interfaces within the film that could lead to cohesive failure, resulting in increased resistance to delamination. Permeation of the entire thickness of the composite network is a function of adhesive polymers that retain higher molecular mobility for longer periods during the coating and lamination process. This may be achieved, for example, by diluting the adhesive in solvent and/or selecting an adhesive with a relatively low Tg which allows the adhesive to permeate through the entire composite coating. This principle is demonstrated in the present application using a "pressure-sensitive adhesive", or PSA. These are currently used as conventional adhesive backings, and have a glass transition temperature of roughly −10° C., well below room temperature, and are sufficiently liquid when applied to the LbL layer to permeate throughout the entire LbL or composite film layer.

We have found that, when typical laminating adhesives are used, even in the presence of a hot-nip to melt the adhesive, there is a limitation to how much of the porous LbL network of the composite coating is penetrated. This process creates a failure point at the interface between the filled and unfilled pores that causes the film to perform poorly in delamination testing. However, when coated with a low $T_g$ adhesive, for example below room temperature, and one that is sufficiently liquid to freely flow into the porous network, the adhesive is able to fully penetrate the LbL film and thus avoid these interfacial failure points.

Those skilled in the art will understand that a suitable solvent may be used, in order to increase the viscosity of the permeating adhesive to ensure that it permeates or penetrates the entire thickness of the composite coating. A variety of solvents may be used for this purpose, so long as the solvent does not affect the adhesive properties of the permeating adhesive. Those skilled in the art will appreciate, as well, that the compatibility of the permeating adhesive with the ionic polymers used in the composite coating will also affect the permeability of the adhesive in the composite coating. For example, an adhesive having acrylic functionality may assist in permeating the composite coating which is characterized by the presence of ionic functionality on the polymer (s) used.

We have found that conventional laminating adhesives may be used, so long as they are sufficiently viscous at the time they are contacted with the composite coating. This may be best accomplished simply by applying the adhesive to the composite coating while liquid, rather than applying the adhesive to the protective layer and drying the adhesive prior to contacting the protective layer with the composite coating.

Turning now to FIGS. 1 and 2, which are schematics that are not drawn to scale, the present invention is directed to an electromagnetic energy-absorbing optical product 10 that includes a polymer substrate 15 and a composite coating 20. The composite coating includes at least a first layer 25 and a second layer 30, which together form a bilayer. Preferably first layer 25 is immediately adjacent to the polymer substrate 20 at its first face 28 and second layer 30 is immediately adjacent to first layer 25 at its opposite face 32. This may be accomplished by depositing the first layer 25 directly on the substrate 15, with a surface treatment such as corona treatment applied if necessary or helpful for proper adhesion of the first layer to the substrate. Each of these layers 25 and 30 may include a polyionic binder, an electromagnetic energy-absorbing insoluble particle, or both.

Each layer 25 and 30 includes a binding group component with the binding group component of the first layer and the binding group component of the second layer constituting a complementary binding group pair. As used herein, the phrase "complementary binding group pair" means that binding interactions, such as electrostatic binding, hydrogen bonding, Van der Waals interactions, hydrophobic interactions, and/or ionic bonds are present between the binding group component of the first layer and the binding group component of the second layer of the composite coating. A "binding group component" is a chemical functionality that, in concert with a complementary binding group component present in an adjacent layer, establishes one or more of the binding interactions described above. The components are complementary in the sense that binding interactions are created, for example through their respective charges. The binding group component of each of the layers may be provided on the polyionic binder, the electromagnetic energy-absorbing insoluble particle, or both.

Each of the layers 25 and 30 of the composite coating may thus include a polyionic binder, defined as a macromolecule containing a plurality of either positively- or negatively-charged moieties along the polymer backbone. Polyionic binders with positive charges are known as polycationic binders while those with negative charges are termed polyanionic binders. Also, it will be understood by one of ordinary skill that some polyionic binders can function as either a polycationic binder or a polyanionic binder depending on factors such as pH and are known as amphoteric. The charged moieties of a polyionic binder may thus constitute the "binding group component" of a given layer.

Suitable polycationic binder examples include poly(allylamine hydrochloride), linear or branched poly(ethyleneimine), poly(diallyldimethylammonium chloride), macromolecules termed polyquaterniums or polyquats and various copolymers thereof. Blends of polycationic binders are also contemplated by the present invention. Suitable polyanionic binder examples include carboxylic acid containing compounds such as poly(acrylic acid) and poly(methacrylic acid), as well as sulfonate containing compounds such as poly(styrene sulfonate) and various copolymers thereof. Blends of polyanionic binders are also contemplated by the present invention.

Polyionic binders of both polycationic and polyanionic types are generally well known to those of ordinary skill in the art and are described for example in U.S. Published Patent Application number US20140079884 to Krogman et al., the disclosure of which is incorporated herein by reference. Examples of suitable polyanionic binders include polyacrylic acid (PAA), poly(styrene sulfonate) (PSS), poly(vinyl alcohol) or poly(vinylacetate) (PVA, PVAc), poly(vinyl sulfonic acid), carboxymethyl cellulose (CMC), polysilicic acid, poly(3,4-ethylenedioxythiophene) (PEDOT) and combinations thereof with other polymers (e.g. PEDOT:PSS), polysaccharides, and copolymers of the above mentioned. Other examples of suitable polyanionic binders include trimethoxysilane functionalized PAA or PAH or biological molecules such as DNA, RNA or proteins. Examples of suitable polycationic binders include poly(diallyldimethylammonium chloride) (PDAC), Chitosan, poly(allyl amine hydrochloride) (PAH), polysaccharides, proteins, linear poly(ethyleneimine) (LPEI), branched poly(ethyleneimine) BPEI and copolymers of the above-mentioned, and the like. Examples of polyionic binders that can function as either polyanionic binders or polycationic binders include amphoteric polymers such as proteins and copolymers of the above mentioned polycationic and polyanionic binders.

The concentration of the polyionic binder in a given layer may be selected based in part on the molecular weight of its charged repeat unit but will typically be between 0.1 mM-100 mM, more preferably between 0.5 mM and 50 mM, and most preferably between 1 and 20 mM based on the molecular weight of the charged repeat unit comprising the layer. In the first layer, the polyionic binder is preferably a polycationic binder and more preferably the polycationic binder is polyallylamine hydrochloride. Most preferably the polyionic binder is soluble in water and the composition used to form the layer is an aqueous solution of polyionic binder. In an embodiment wherein the polyionic binder is a polycation and the first layer is formed from an aqueous solution, the pH of the aqueous solution is selected so that from 5 to 95%, preferably 25 to 75%, or approximately half of the ionizable groups are protonated. Other optional ingredients include biocides or shelf-life stabilizers.

The second layer 30 of the composite coating 20 may likewise include a polyionic binder as described above, an electromagnetic energy-absorbing insoluble particle, or both. The phrase "electromagnetic energy-absorbing" means that the particle is purposefully selected as a component for the optical product for its preferential absorption at particular spectral wavelength(s) or wavelength ranges(s). The term "insoluble" is meant to reflect the fact that the particle does not substantially dissolve in the composition used to form the layer and exists as a particle in the optical product structure. The electromagnetic energy-absorbing insoluble particle is preferably a visible electromagnetic energy absorber, such as a pigment; however, insoluble particles such as UV absorbers or IR absorbers, or absorbers in various parts of the electromagnetic spectrum that do not necessarily exhibit color are also within the scope of the present invention. The electromagnetic energy-absorbing particle is preferably present in a given layer in an amount of from 30% to 60% by weight based on the total weight of the layer. In order to achieve the desired final electromagnetic energy absorption level, the layer may be formed from a composition that includes the insoluble electromagnetic energy-absorbing particle in an amount of 0.25 to 2 weight percent based on the total weight of the composition.

Pigments suitable for use as the electromagnetic energy-absorbing insoluble particle in a preferred embodiment are preferably particulate pigments with an average particle diameter of between 5 and 300 nanometers, more preferably between 10 and 50 nanometers, often referred to in the art as nanoparticle pigments. Even more preferably, the surface of the pigment provides a binding group component of a given layer. Suitable pigments are available commercially as colloidally stable water dispersions from manufacturers such as Cabot, Clariant, DuPont, Dainippon and DeGussa. Particularly suitable pigments include those available from Cabot Corporation under the Cab-O-Jet® name, for example 250C (cyan), 265M (magenta), 270Y (yellow) or 352K (black). In order to be stable in water as a colloidal dispersion, the pigment particle surface is typically treated to impart ionizable character thereto and thereby provide the pigment with the desired binding group component on its surface. It will be understood that commercially available pigments are sold in various forms such as suspensions, dispersions and the like, and care should be taken to evaluate the commercial form of the pigment and modify it if necessary to ensure its compatibility and performance with the optical product components, particularly in the embodiment wherein the pigment surface also functions as the binding group component of the second layer.

Multiple pigments may be utilized in a given layer to achieve a specific hue or shade or color in the final product; however, it will again be understood by ordinary skill that, should multiple pigments be used, they should be carefully selected to ensure their compatibility and performance both with each other and with the optical product components. This is particularly relevant in the embodiment wherein the pigment surface also functions as a binding group component of a layer, as for example particulate pigments can exhibit different surface charge densities due to different chemical modifications that can impact compatibility.

Preferably the layer of the composite coating containing the particles just described further includes a screening agent. A "screening agent" is defined as an additive that promotes even and reproducible deposition of the layer via improved dispersion of the electromagnetic energy-absorbing insoluble particle within the layer by increasing ionic strength and reducing interparticle electrostatic repulsion. Screening agents are generally known and are described for example in U.S. Published Patent Application number US20140079884 to Krogman et al., the disclosure of which is incorporated herein by reference. Examples of suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$), $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents. Sodium chloride is typically a preferred screening agent based on ingredient cost. The presence and concentration level of a screening agent may allow for higher loadings of the electromagnetic energy-absorbing insoluble particle such as those that may be desired in optical products with a $T_{vis}$ of no more than 50% and also may allow for customizable and carefully controllable loadings of the electromagnetic energy-absorbing insoluble particle to achieve customizable and carefully controllable optical product $T_{vis}$ levels.

Suitable screening agent concentrations can vary with salt identity and are also described for example in U.S. Published Patent Application number US20140079884 to Krogman et al. In some embodiments, the screening agent concentration can range between 1 mM and 1000 mM or between 10 mM and 100 mM or between 30 mM and 80 mM. In some embodiments, the screening agent concentration is greater than 1 mM, 10 mM, 100 mM or 500 mM. The layer of the composite coating that contains these particles may also contain other ingredients such as biocides or shelf-life stabilizers.

In some embodiments, the optical products of the present invention may include a plurality of bilayers. For example, as depicted in FIG. 2, the optical product 10 includes first and second composite coatings 20 and 20', each with a first layer and a second layer that together form a bilayer, i.e. the first composite coating 20 or bilayer includes a first layer 25 and a second layer 30, and a second composite coating 20' or bilayer includes a first layer 25' and a second layer 30'. This depiction is not intended to be limiting in any way on the possible number of layers or bilayers. One of ordinary skill will appreciate that this depiction is simply exemplary and illustrative of an embodiment with multiple or a plurality of bilayers, or those in which at least one bilayer is provided and in which the final layer need not be a bilayer, that is, the final layer may not have a corresponding second layer. The examples below further illustrate embodiments with a plurality of composite coatings.

For embodiments with a plurality of composite coatings, it will be appreciated that the electromagnetic energy-absorbing insoluble particle for a given layer in each composite coating may be independently selected and that the layers will in combination provide an additive effect on the electromagnetic energy-absorbing character and effect of the electromagnetic energy-absorbing optical product. For the embodiment shown in FIG. 2, this means that, in cases where the particles are in the second layer, the second layer 30 of the first composite coating 20 and the second layer 30' of the second composite coating 20' in combination provide an additive effect on the electromagnetic energy-absorbing character and effect of the electromagnetic energy-absorbing optical product. This additive effect can be customized and controlled in part by the concentration of the electromagnetic energy-absorbing particle in each second layer as dispersed through the presence of the screening agent.

For example, in an embodiment wherein the electromagnetic energy-absorbing particle is a pigment provided in the second layer, the second layers will in combination provide an additive effect on the visually perceived color of the optical product. In this embodiment, the pigments for each second layer may be of the same or similar composition and/or color such that the additive effect is to increase intensity or depth or darkness of the visually perceived color of the optical product or, stated another way, to reduce electromagnetic transmittance in the visible wavelength range (or $T_{vis}$). In another embodiment, carbon black is used as the pigment for at least one second layer and pigments such as those listed above are used as pigments for the other second layer(s) such that the additive effect is a visually perceived darkened color, also reducing electromagnetic transmittance in the visible wavelength range (or $T_{vis}$). As discussed above, the present invention may be useful in products wherein relatively high levels of darkening are desired. Accordingly, in a particularly preferred embodiment, the optical products of the present invention have a $T_{vis}$ of no more than 50%. In yet another embodiment, the pigments for each second layer may be of complimentary composition and/or color such that the additive effect is a visually perceived color different from and formed by the combination of the individual pigments, for example an additive perceived "green" color achieved by utilizing a blue pigment for one second layer and a yellow pigment for another second layer.

Referring again to FIGS. 1 and 2, the optical product 10 of the invention further comprises a permeating adhesive 40, which permeates the composite coating 20 and is in contact with the polymer substrate 15, as indicated by the shading throughout the permeating adhesive 40 and the composite coating 20 which the adhesive permeates. The optical product 10 further comprises a protective layer 50, secured to the composite coating 20 by the permeating adhesive 40.

The permeating adhesive may be any adhesive that is sufficiently liquid at the temperature applied so as to fully penetrate or permeate the composite coating and contact the underlying polymer substrate 15, while securing the composite coating 20 to the protective layer 50. Examples of suitable permeating adhesives include pressure sensitive adhesives, for example acrylic pressure sensitive adhesives, which may be selected within a relatively broad range of molecular weights and Tg values, since the adhesive may be diluted as desired to achieve the necessary permeability in the composite coating. As known in the adhesives art, pressure sensitive adhesives (PSAs) are viscoelastic materials that display both a fluid-like character that is important for forming mechanical contact with a surface under light pressure for a short amount of time, and an elastic solid character that resists various applied stresses after bond formation. The Handbook of Pressure Sensitive Adhesive Technology describes PSAs, and in particular, their ability to wet surfaces (tack) as a modulus-controlled process. PSAs may thus be characterized as having a specific modulus of less than about 105 dyne/cm2 or less than 100 dyne/cm2 at room temperature, and optionally as displaying the ability to spontaneously (or with light pressure and low contact times) fully wet out an adherend. (See, for example, Satas, D. Ed. Handbook of Pressure Sensitive Adhesive Technology 3rd Edition; Satas and Associates: R.I. 1999).

The acrylic PSA adhesives useful according to the invention are typically mid- to high-molecular weight polymers emulsified in water or as a solvent solution. They may be used as one-part adhesives that rely on their molecular weight for the necessary properties, or are self-cross-linking, or may be two-part systems that include a cross-linker, providing higher performance. PSAs useful according to the invention may thus be water- or solvent-based, styrenic block copolymer-based, or silicone-based, whether solvent or hotmelt, and the styrenic polymers may be formulated, for example, with tackifiers and processing oils to achieve the desired permeability in the composite coating. Examples of acrylic pressure sensitive adhesives that may be adapted for use according to the invention include Loctite Duro-Tak acrylic adhesives, available from Henkel Corporation, Bridgewater, N.J.

Other permeating adhesives useful according to the invention include dry-bond laminating adhesives, both acrylic and polyester-based polyurethanes, though their higher molecular weight may require heat or the presence of water or a solvent to ensure that they fully permeate or penetrate the composite coating. This may necessitate the presence of sufficient solvent such that these adhesives would, in practice, be applied as a liquid. Other permeating adhesives that may be useful include wet-bond laminating adhesives, whether polyether or polyester polyurethanes or energy-cured acrylic formulations. These wet-bond laminating adhesives are similar to dry-bond adhesives except that they are liquids when coated or laminated. Structural adhesives that are liquids as applied may be adapted for use according to the invention, and include epoxies and structural acrylics.

The property believed primarily responsible for the ability of the permeating adhesive to fully penetrate or permeate the composite coating and contact the underlying polymer substrate, while securing the composite coating 20 to the protective layer, is the viscosity of the permeating adhesive at the time of contact with the composite coating. The viscosity of the permeating adhesive at the time of application may thus vary, for example, from about 5 cps to about 1,000 cps, or from 10 to 700 cps, or from 20 to 500 cps.

The affinity of the permeating adhesive for the composite coating may also affect the ability of the permeating adhesive to fully penetrate or permeate the composite coating and contact the underlying polymer substrate, while securing the composite coating to the protective layer. For example, adhesive polymers having acrylic functionality may be especially compatible with the composite coatings of the invention which comprise ionic polymers and optionally charged nanoparticles.

The amount of permeating adhesive used may vary widely, based on such factors as intended use of the resulting optical product, the thickness of the composite coating which the adhesive must penetrate, the desired tack, shear, and the like. For example, the permeating adhesive may be applied in an amount of from 1 to 10 lbs./ream.

The means of applying the permeating adhesive to the optical product is not especially limited, so long as the permeating adhesive is sufficiently liquid under the conditions applied so as to fully penetrate or permeate the composite coating and to contact the underlying polymer substrate 15, while securing the composite coating 20 to the protective layer 50. For example, the permeating adhesive may be applied to the protective layer, prior to the protective layer being joined to the composite coating, for example at elevated temperature using slot die coating. Alternatively, the permeating adhesive may be applied to the composite coating, and the protective layer subsequently applied to the composite coating/permeating adhesive so as to secure the protective layer to the composite coating. For composite coatings containing many bi-layer pairs, it may be advantageous to apply the adhesive to the composite coating rather than to the protective layer to ensure that the permeating adhesive permeates entirely through the thickness of the composite coating.

The permeating adhesive of the invention, used to laminate the composite coating to the protective layer, should be distinguished from an adhesive backing that may be used to attach the laminated optical products of the invention to glass, for example for use as a window film. In such cases, a conventional adhesive backing may be used, for example a pressure sensitive adhesive, to attach the optical products of the invention to the surface on which they are to be used, and especially to glass.

The polymer substrate 15 may in the broadest sense be any substrate known in the art as useable as an optical product component, and may be the same or different than the protective layer 50. Suitable polymer substrates and protective layers are typically flexible polymer film, more particularly a polyethylene terephthalate (PET) film of a thickness of between about 10 microns and about 400 microns, or from $12\mu$ to $375\mu$ or a polyvinyl butyral (PVB) film, preferably of a thickness of between 0.01 to 1 mm and more preferably a thickness of 15 to 30 mils. Because prior art optical products that employ dyes exhibit a variety of drawbacks, the polymer substrate and the protective layer are preferably undyed transparent polyethylene terephthalate films. The polymer substrate and/or the protective layer may also be a flexible polyurethane or flexible poly(vinyl chloride) film or may be a flexible multilayer polymer composite film such as a polyurethane-based multilayer composite film as described for example in U.S. Pat. No. 8,765,263, the disclosure of which is incorporated herein by reference.

The polymer substrate 15 and protective layer 50 may further include additives known in the art to impart desirable characteristics. Examples include ultraviolet (UV) absorbing materials such as benzotriazoles, hydroxybenzophenones or triazines. A useful polymer substrate with a UV absorbing additive incorporated therein is described in U.S. Pat. No. 6,221,112, originally assigned to a predecessor assignee of the present invention. The polymer substrate 15 and the protective layer 50 may thus be any substrate known in the art as useable as an optical product component, and may be the same or different than one another.

In one embodiment, wherein the polymer substrate and protective layer are flexible polymeric films such as PET, the optical product may be a window film that may be adhered to glass using an adhesive backing. As well known in the art, conventional window films are designed and manufactured with levels of electromagnetic energy transmittance or reflectivity that are selected based on a variety of factors such as for example product end use market application and the like. In one embodiment, the optical product of the present invention has visible light transmittance or $T_{vis}$ of no more than 50%, preferably no more than 45% and more preferably no more than 40%. Such levels of visible light transmittance are often desired in window films with high levels of darkening for certain automotive end use applications such as sidelights. In another embodiment, the optical product of the present invention has visible light transmittance or $T_{vis}$ of from 80 to 85%. Such levels of visible light transmittance are often desired in window films with relatively moderate to low levels of darkening, typically also with infrared absorption, for certain automotive end use applications such as windscreens. In yet another embodiment, the optical product of the present invention has visible light transmittance or $T_{vis}$ of no less than 85%, preferably no less than 88% and more preferably no less than 90%. Such levels of visible light transmittance are often desired in window films with low to minimal levels of darkening for certain architectural end use applications.

The window films may optionally include additional layers or coatings known to those of ordinary skill in the window film art. Coatings for example may include protective hardcoats, scratch-resist or "SR" coats, further adhesive layers, protective release liners, and the like. Layers may include, for example, metallic layers and/or metal oxide layers applied by sputtering or other known techniques. Such layers or coatings may be components of the polymer substrate. Further, the polymer substrate may be a laminated or multilayer structure.

In one embodiment, the optical product is an interlayer for laminated glass. In this embodiment, the polymer substrate and protective film may be formed from film-forming materials known in the art for these purposes, including for example plasticized polyvinyl butyral (PVB), polyurethanes, polyvinyl chloride, polyvinylacetal, polyethylene, ethyl vinyl acetates and the like. A preferred film-forming material for the interlayer is a plasticized PVB such as that used in a commercially available from Eastman Chemical Company as SAFLEX® PVB interlayer. In this embodiment, the composite coating may be formed on at least one surface of the polymer substrate.

In an embodiment wherein the polymer substrate and/or the protective layer are flexible polymeric films such as PET, the optical product may be a composite interlayer for laminated glass including at least one safety film or interlayer. The safety film may be formed from film-forming materials known in the art for this purpose, including for example plasticized polyvinyl butyral (PVB), polyurethanes, polyvinyl chloride, polyvinylacetal, polyethylene, ethyl vinyl acetates and the like. Preferred safety film is a plasticized PVB film or interlayer commercially available from Eastman Chemical Company as SAFLEX® PVB interlayer. Preferably, the composite interlayer includes two safety films or one film layer and one coating layer, such as a PVB coating that encapsulates the polymer substrate. Composite interlayers of this general type are known in the art and are described for example in U.S. Pat. Nos. 4,973,511 and 5,091,258, the contents of which are incorporated herein by reference.

In another embodiment, the optical product of the present invention is a composite for coloring an opaque article by application thereto. Such composites are known in the art and are sometimes referred to in the art as colorant composites, paint composites or car wraps. More particularly, the article may be a vehicle selected from the group consisting of an automobile, aircraft or boat; a vehicle panel or part such as a bumper, hood, fender or door; and a portion thereof. In this embodiment, the optical product is applied to or adhered to the article using techniques described in the above-referenced '263 patent or in U.S. Pat. No. 5,030,513, the disclosure of which is also incorporated herein by reference. One of ordinary skill will appreciate that the term "coloring" means for example imparting a color, multiple colors or an aesthetic color-based design or pattern to the opaque article.

In another aspect, the present invention is directed to a method for forming an optical product. The method of the present invention includes the steps of applying a first coating composition to a polymer substrate to form a first layer, and applying a second coating composition atop said first layer to form a second layer, said first layer and said second layer together constituting the composite coating of the invention. The first and second coating compositions include a polyionic binder and/or an electromagnetic energy-absorbing insoluble particle and each of the first and second coating compositions includes a binding group component which together form a complimentary binding group pair. The coating composition may include a screening agent as described above.

In a preferred embodiment, at least one of the first and second coating compositions are an aqueous dispersion or solution and most preferably both of the first and second coating compositions are an aqueous dispersion or solution. In this embodiment, both applying steps (a) and (b) are performed at ambient temperature and pressure.

The optical products of the present invention are preferably manufactured using known "layer-by-layer" (LbL) processes such as described in Langmuir, 2007, 23, 3137-3141 or in U.S. Pat. Nos. 8,234,998 and 8,689,726 and U.S, Published Application US 20140079884, co-invented by co-inventor Krogman of the present application, the disclosures of which are incorporated herein by reference.

According to the methods of the present invention, once the composite film is deposited on the polymer substrate, the permeating adhesive may be placed in contact with the composite film so that it permeates the composite film. The permeating adhesive may be contacted directly with the composite film, or alternatively may be contacted with the composite film after being applied to the protective layer.

The foregoing description of various embodiments of the invention has been presented for purposes of illustration and description. It is not intended to be exhaustive or to limit the invention to the precise embodiments disclosed. Numerous modifications or variations are possible in electromagnetic energy of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

EXAMPLES

In a first set of examples, an LbL coated substrate was used in which the PET substrate had deposited on it alternating layers of polyallylamine hydrochloride (PAH) polymer and a pigment combination that included carbon black Cab-o-jet 352K, cyan Cab-o-jet 250C, and magenta Cab-o-jet 265M, all from Cabot Corporation. A total of 25 bilayers were deposited. Two different adhesives, a PSA (a self-cross-linking solution acrylic Duro-Tak 109A from Henkel) and a conventional laminating adhesive (Adcote 76R36 (Dow), an aliphatic polyester polyol formulated with an isocyanate cross-linker), were each applied via gravure roller to separate 3 mil PET substrates and each substrate was then passed through a drying oven in which the solvent was evaporated. The adhesive-coated PET films were each then hot nipped to a previously coated Layer-by-Layer film, at 180° F. and 4 bar nip pressure at a 10 fpm line speed.

A bag delamination test was performed on these examples to test the adhesive and cohesive strength of the laminated optical products of the invention, when applied to glass, under constant load. The film sample, via an adhesive backing, was applied to clean glass using water. The glass was approximately 3"×5"×3/16" Clear Float glass, and the film sample was approximately 3"×6" with the machine direction in the long direction.

After application to the glass, a one-inch strip was cut down the film sample using a razor, and a peel was initiated with the razor between the polymer substrate and the protective layer. About 1 inch of this strip portion was then peeled away by hand, and a weight attached that was chosen so that the strip would not tear, typically in increments of 10 g. The sample was then left to hang for 24 hours, after which the weight was increased by about 10 g if necessary. Film tears were recorded with respect to time and distance on a daily basis. We found that samples in which the adhesive did not permeate the coating layer, that is, those in which the traditional laminating adhesive was used, resulted in increased delamination, with the delamination occurring within the composite coating or at the interface between the composite coating and the adhesive.

In a further set of examples, an LbL coated substrate was used in which the PET substrate had deposited on it alternating layers of a polyallylamine hydrochloride (PAH) and a pigment combination that included carbon black Cab-o-jet 352K, cyan Cab-o-jet 250C, and magenta Cab-o-jet 265M, all from Cabot. Adcote 76R36 (Dow) as used above was applied to the Layer-by-Layer coated substrate and the film was then passed through a drying oven in which the solvent was evaporated. The adhesive-coated LbL film was then hot nipped to a protective layer substrate.

Adhesion was tested according to a standard liner release peel test method (ASTM D3330, Test Method A, 180 deg, 6 in/min, 1 in wide). The laminate gave peel values of ~300 g/in in two separate trials, consistent with peel values for laminates not containing an LbL layer, confirming both substrate layers are in contact with the adhesive.

We claim:

1. An optical product comprising:
a) a polymer substrate;
b) a plurality of bilayers, deposited on the polymer substrate, each bilayer comprising a first layer and a second layer, each of the first and second layers comprising a binding group component which together form a complementary binding group pair;
c) a permeating adhesive, which permeates the plurality of bilayers and is in contact with the polymer substrate; and
d) a protective layer, secured to the plurality of bilayers by the permeating adhesive.

2. The optical product of claim 1, wherein the permeating adhesive comprises at least one of a pressure sensitive adhesive, a wet-bond laminating adhesive, and a structural adhesive.

3. The optical product of claim 1, wherein the viscosity of the permeating adhesive prior to the permeating adhesive permeating the plurality of bilayers is from 20 to 500 cps.

4. The optical product of claim 1, wherein the polymer substrate is selected from the group consisting of a polyvinyl butyral film, a flexible polyurethane film, a flexible polyethylene terephthalate film, a flexible poly(vinyl chloride) film, and a flexible multilayer polymer composite film.

5. The optical product of claim 1, wherein the protective layer is selected from the group consisting of a polyvinyl butyral film, a flexible polyurethane film, a flexible polyethylene terephthalate film, a flexible poly(vinyl chloride) film, and a flexible multilayer polymer composite film.

6. The optical product of claim 1, wherein the plurality of bilayers has a total thickness of 5 nm to 300 nm.

7. The optical product of claim 1, wherein the first layer of a first bilayer is immediately adjacent to the polymer substrate at its first face and the second layer of the first bilayer is immediately adjacent to the first layer at its opposite face.

8. The optical product of claim 1, wherein at least one of the first and second layers of each of the plurality of bilayers comprises a polyionic binder.

9. The optical product of claim 1, where at least one of the first and second layers of each of the plurality of bilayers comprises an electromagnetic energy-absorbing particle that is a particulate pigment.

10. The optical product of claim 9, where the particulate pigment has an average particle diameter between 5 and 300 nanometers.

11. The optical product of claim 9, where the particulate pigment has an average particle diameter between 10 and 50 nanometers.

12. The optical product of claim 1 wherein at least one of said first layer and said second layer of each of the plurality of bilayers is formed from an aqueous solution.

13. The optical product of claim 1 wherein the optical product has a Tvis of no more than 50%.

14. The optical product of claim 1, wherein the optical product has a Tvis of no less than 80%.

15. The optical product of claim 1, wherein the polymer substrate is a flexible multilayer polymer composite film.

16. The optical product of claim 1, wherein the optical product is a composite for coloring an opaque article by application thereto.

17. The optical product of claim 1, wherein the plurality of bilayers comprises at least three bilayers.

18. The optical product of claim 1, wherein the plurality of bilayers comprises at least five bilayers.

19. A method of forming an optical product, comprising:
depositing on a polymer substrate a plurality of bilayers, each bilayer comprising at least a first layer and a second layer, each of the first and second layers comprising a binding group component which together form a complementary binding group pair;
applying a permeating adhesive to the plurality of bilayers, which permeating adhesive permeates the plurality of bilayers so as to contact the polymer substrate; and
securing a protective layer to the plurality of bilayers, by contacting the protective layer with the permeating adhesive on a surface of the plurality of bilayers.

20. The method of claim 19, wherein the viscosity of the permeating adhesive prior to the permeating adhesive being applied to the plurality of bilayers is from 20 to 500 cps.

21. The method of claim 19, wherein the plurality of bilayers has a total thickness of 5 nm to 300 nm.

22. The method of claim 19, wherein the first layer of a first bilayer is immediately adjacent to the polymer substrate at its first face and the second layer of the first bilayer is immediately adjacent to the first layer at its opposite face.

23. The method of claim 19, wherein at least one of the first and second layers of each of the plurality of bilayers comprises a polyionic binder.

24. The method of claim 19, where at least one of the first and second layers of each of the plurality of bilayers comprises an electromagnetic energy-absorbing particle that is a particulate pigment.

25. The method of claim 19, wherein the plurality of bilayers comprises at least three bilayers.

26. The method of claim 19, wherein the plurality of bilayers comprises at least five bilayers.

* * * * *